US012661942B2

(12) United States Patent (10) Patent No.: US 12,661,942 B2
Harris et al. (45) Date of Patent: Jun. 23, 2026

(54) ADJUSTABLE TOW HOOK ASSEMBLIES AND VEHICLES INCLUDING SAME

(71) Applicant: Toyota Motor Engineering & Manufacturing North America, Inc., Plano, TX (US)

(72) Inventors: Ryan C. Harris, Saline, MI (US); Scott L Frederick, Brighton, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 834 days.

(21) Appl. No.: 17/969,814

(22) Filed: Oct. 20, 2022

(65) Prior Publication Data

US 2024/0131884 A1 Apr. 25, 2024
US 2024/0227474 A9 Jul. 11, 2024

(51) Int. Cl.
B60D 1/54 (2006.01)

(52) U.S. Cl.
CPC ..................................... B60D 1/54 (2013.01)

(58) Field of Classification Search
CPC .. B60R 19/48; B60D 1/54; B60D 1/04; B60D 1/565; B60D 1/1675; B60D 1/246; B60D 1/488; B60D 1/26; B60D 1/243
USPC ....................................................... 280/491.1
See application file for complete search history.

(56) References Cited

U.S. PATENT DOCUMENTS 4,570,966 A * 2/1986 Giboney ............ B62D 53/0842
280/433
7,273,222 B2 9/2007 Rampp 7,472,919 B2 1/2009 Pratt et al.
7,753,396 B2 7/2010 Jamieson et al.
7,775,546 B2 8/2010 Asjad
(Continued)

FOREIGN PATENT DOCUMENTS

AU 2021105428 A4 * 10/2021 ............... B60D 1/06
CA 2364274 A1 6/2003
(Continued)

OTHER PUBLICATIONS

Volvo XC90 Retractable Hitch manual, https://www.volvocars.com/en-ca/support/manuals/xc90/2019w17/starting-and-driving/trailer-hitch-and-trailer/retractable-hitch, accessed on Apr. 19, 2022.

*Primary Examiner* — Alentin Neacsu
*Assistant Examiner* — Morgan Knauf
(74) *Attorney, Agent, or Firm* — Dinsmore & Shohl LLP

(57) ABSTRACT

A vehicle including a cross member and a tow hook assembly. The tow hook assembly is coupled to the cross member and includes a housing, a tow hook, and a shear pin. The housing includes an arcuate interior. The tow hook is moveable between an extended position and a retracted position. The tow hook includes a retaining block and a receiving member having a distal portion extending from the retaining block and a leading portion extending from the distal portion. The shear pin is positionable to extend through the housing. When the tow hook is in the extended position and a force exceeding a predetermined threshold is applied to the leading portion of the receiving member, the shear pin shears to permit the retaining block of the tow hook to move along the arcuate interior of the housing and position the tow hook into the retracted position.

10 Claims, 4 Drawing Sheets

(56)                    References Cited

U.S. PATENT DOCUMENTS

|  |  |  |  |  |
|---|---|---|---|---|
| 8,905,424 | B2 | 12/2014 | Williams, Jr. et al. | |
| 10,457,104 | B2 | 10/2019 | Shenaq et al. | |
| 11,059,336 | B1 * | 7/2021 | Perry ...................... | B60D 1/54 |
| 2004/0090041 | A1 * | 5/2004 | Lenzen, Jr. .............. | B60D 1/52 |
| | | | | 280/495 |
| 2018/0326802 | A1 * | 11/2018 | Olson ...................... | B60D 1/58 |
| 2019/0084361 | A1 * | 3/2019 | Ghannam ................ | B60D 1/56 |
| 2020/0171894 | A1 * | 6/2020 | Shenaq ................... | B60D 1/04 |

FOREIGN PATENT DOCUMENTS

|  |  |  |  |  |  |
|---|---|---|---|---|---|
| CN | 214822422 | U | 11/2021 | | |
| DE | 102012014176 | B4 | 12/2021 | | |
| EP | 1836063 | B1 | 9/2007 | | |
| EP | 3708391 | A1 | 9/2020 | | |
| JP | 2003002136 | A | 1/2003 | | |
| KR | 1010807240000 | B1 | 11/2011 | | |
| KR | 20120041363 | A | 5/2012 | | |
| WO | WO-2020022083 | A1 * | 1/2020 | .............. | B60D 1/04 |

* cited by examiner

ADJUSTABLE TOW HOOK ASSEMBLIES AND VEHICLES INCLUDING SAME

TECHNICAL FIELD

The present specification generally relates to tow hooks for vehicles and, more specifically, tow hook assemblies including a tow hook slidably moveable between a plurality of positions.

BACKGROUND

To tow a vehicle in the event of an accident, malfunction, loss of gas, or being stuck in mud or snow, tow hooks are provided at specific locations of a frame of the vehicle to tow the vehicle without damage. Tow hooks are typically mounted on a front rail of the vehicle and may extend through apertures formed in a front bumper of the vehicle to project outwardly therefrom. Alternatively, tow hooks may project from beneath the front bumper or any other suitable location of the vehicle, for example, the rear of the vehicle.

Tow hooks are typically formed from rigid materials to withstand large forces when the vehicle is being towed and to remain secured to the vehicle itself. However, the tow hook is connected to the vehicle in a way that may damage one or more parts of the vehicle, occupant, or a pedestrian during a front end collision.

Accordingly, a need exists for tow hook assemblies operable between a plurality of positions to reduce an impact force with various parts of the vehicle during a front end collision.

SUMMARY

In one embodiment, a tow hook assembly coupled to a cross member of a vehicle, the tow hook assembly includes a housing, a tow hook, and a shear pin. The housing includes an arcuate interior. The tow hook is moveable between an extended position and a retracted position, and includes a retaining block and a receiving member. The receiving member includes a distal portion extending from the retaining block and a leading portion extending from the distal portion. The shear pin is positionable to extend through the housing. When the tow hook is in the extended position and a force exceeding a predetermined threshold is applied to the leading portion of the receiving member, the shear pin shears to permit the retaining block of the tow hook to within the arcuate interior of the housing and position the tow hook into the retracted position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicle tow hook assemblies that include a tow hook moveable between an extended position and a retracted position, such that the tow hook moves from the extended position and into the retracted position upon an impact force during a front end collision. The various components of the tow hook assemblies disclosed herein may be positioned such that an impact force against various components of the vehicle, as well as a pedestrian in front of the vehicle, is minimized during a front end collision.

The vehicles described herein include tow hook assemblies coupled to a cross member of the vehicle. The tow hook assemblies include a housing with an arcuate interior, a shear pin extending through the housing, and a tow hook moveable between the extended position and the retracted position. The tow hook includes a retaining block and a receiving member. The receiving member has a distal portion extending out from the retaining block. A leading portion extends from the distal portion. Upon a force exceeding a predetermined threshold applied against the leading portion of the tow hook when in the extended position, the shear pin will shear and permit the retaining block of the tow hook to move along the arcuate interior of the housing, moving the tow hook from the extended position to the retracted position.

Figure 1:
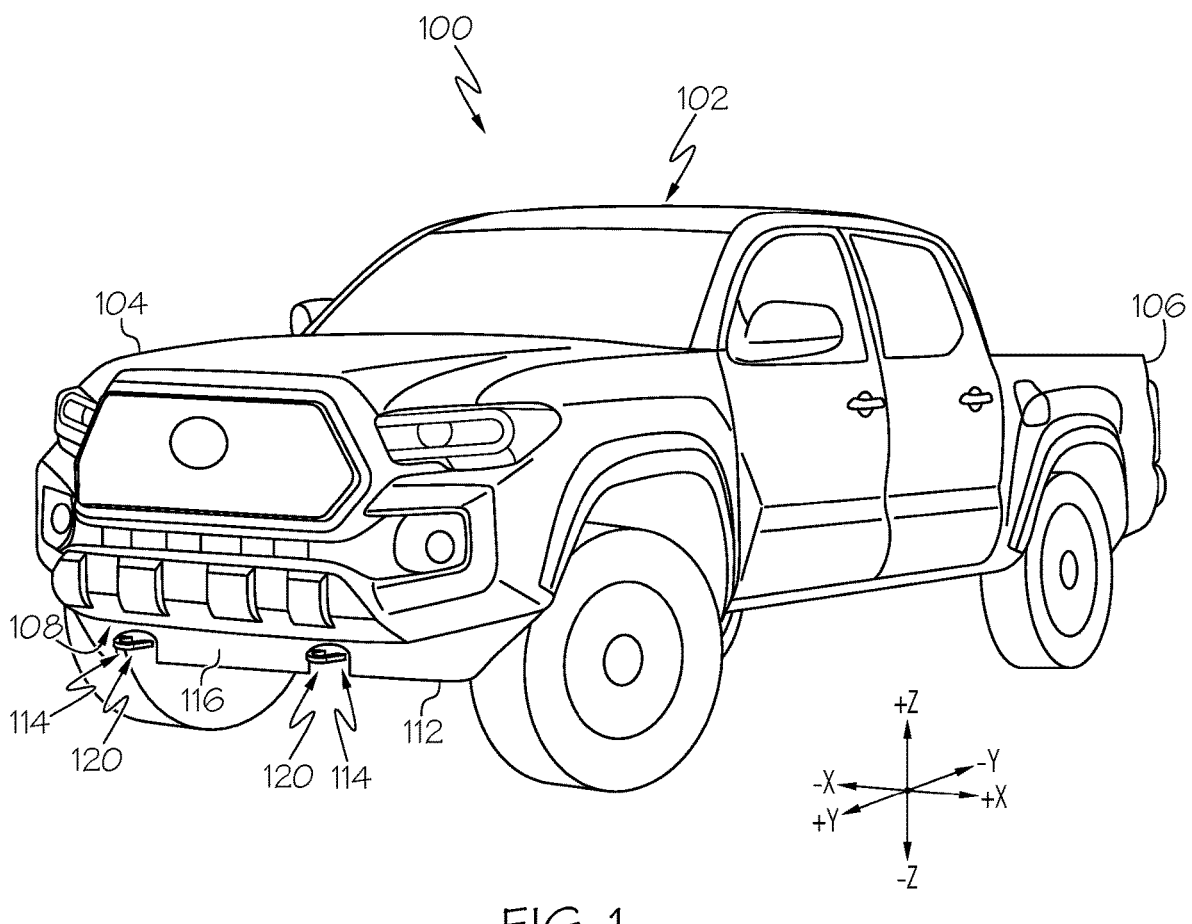
FIG. 1 schematically depicts a perspective view of a vehicle including a pair of tow hook assemblies, according to one or more embodiments shown and described herein.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring to FIG. 1, a vehicle 100 is generally illustrated according to one or more embodiments described herein. As shown, the vehicle 100 is illustrated as a pickup truck. However, the vehicle 100 may be any suitable automobile including coupes, sedans, minivans, crossovers, hybrids, sports utility vehicles, or the like, in addition to other vehicles such as a bus, boat, or the like, without limiting the scope of the present disclosure. The vehicle 100 includes a body 102 having a front end 104, a rear end 106 opposite the front end 104, a front bumper 108 having a bottom surface 112 and a front surface 116, and a frame member such as a cross member 134 (FIG. 2) positioned rearward of the front bumper 108 in the vehicle longitudinal direction and provided proximate the front end 104 of the body 102 of the vehicle 100. One or more openings 114 are defined in the front surface 116 the front bumper 108 and extend downward in the vehicle vertical direction through the bottom surface 112 of the front bumper 108. As shown, a pair of openings 114 are formed in the front bumper 108 and spaced apart from one another proximate opposite sides of the body 102. However, it should be appreciated that any number of openings 114 may be formed such as, for example, one opening 114 or more than two openings 114.

The vehicle 100 includes one or more tow hook assemblies 120 located at the front end 104 of the body 102 of the vehicle 100. For example, as depicted herein, the vehicle 100 includes a pair of tow hook assemblies 120 with each tow hook assembly 120 extending through a corresponding opening 114 formed in the front bumper 108. However, it should be appreciated that the vehicle 100 may include any number of tow hook assemblies 120, such as one tow hook assembly 120 or more than two tow hook assemblies 120. In addition, the tow hook assembly 120 may be mounted at any suitable location of the vehicle 100. For example, the vehicle 100 may include a pair of tow hook assemblies 120 mounted to the cross member 134 at the front end 104 of the vehicle 100 and extend out from below the bottom surface 112 of the front bumper 108 of the vehicle 100.

Figure 2:
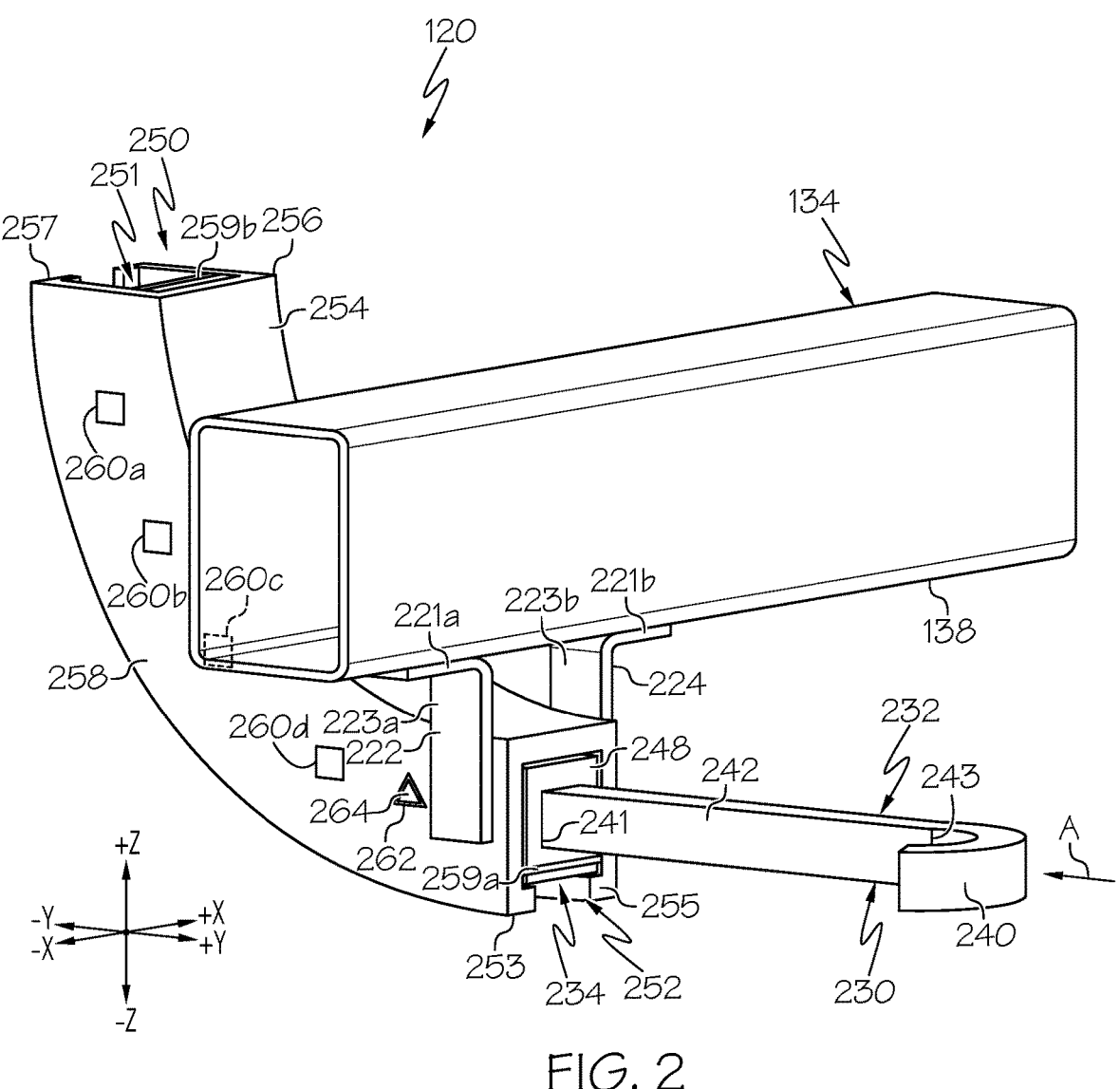
FIG. 2 schematically depicts a perspective view of one of the tow hook assemblies of the vehicle of FIG. 1 in an extended position, according to one or more embodiments shown and described herein.

Now referring to FIG. 2, a perspective view of the tow hook assembly 120 in an extended position is shown. As shown, the tow hook assembly 120 is mounted to the cross member 134 of the vehicle 100 (FIG. 1). The cross member 134 has one or more walls such as, for example, a lower wall 138. The two hook assembly 120 includes a housing 250 and a tow hook 230 movably positioned within the housing 250.

The housing 250 includes an upper surface 254, a lower surface 253 opposite the upper surface 254, a first side wall 256, a second side wall 258 opposite the first side wall 256, a front end 255, and a rear end 257 opposite the front end 255. The upper surface 254, the lower surface 253, the first side wall 256, and the second side wall 258 cooperate to define a curved or arcuate interior 251. The arcuate interior 251 extends from the front end 255 of the housing 250 to the rear end 257 of the housing 250. The rear end 257 is positioned above the front end 255 in the vehicle vertical direction and rearwardly of the front end 255 in the vehicle longitudinal direction. A slot 252 is formed in the lower surface 253 of the housing 250, between the first side wall 256 and the second side wall 258, extending from the front end 255 to the rear end 257 of the housing 250. The slot 252 being in communication with the arcuate interior 251.

Figure 3:
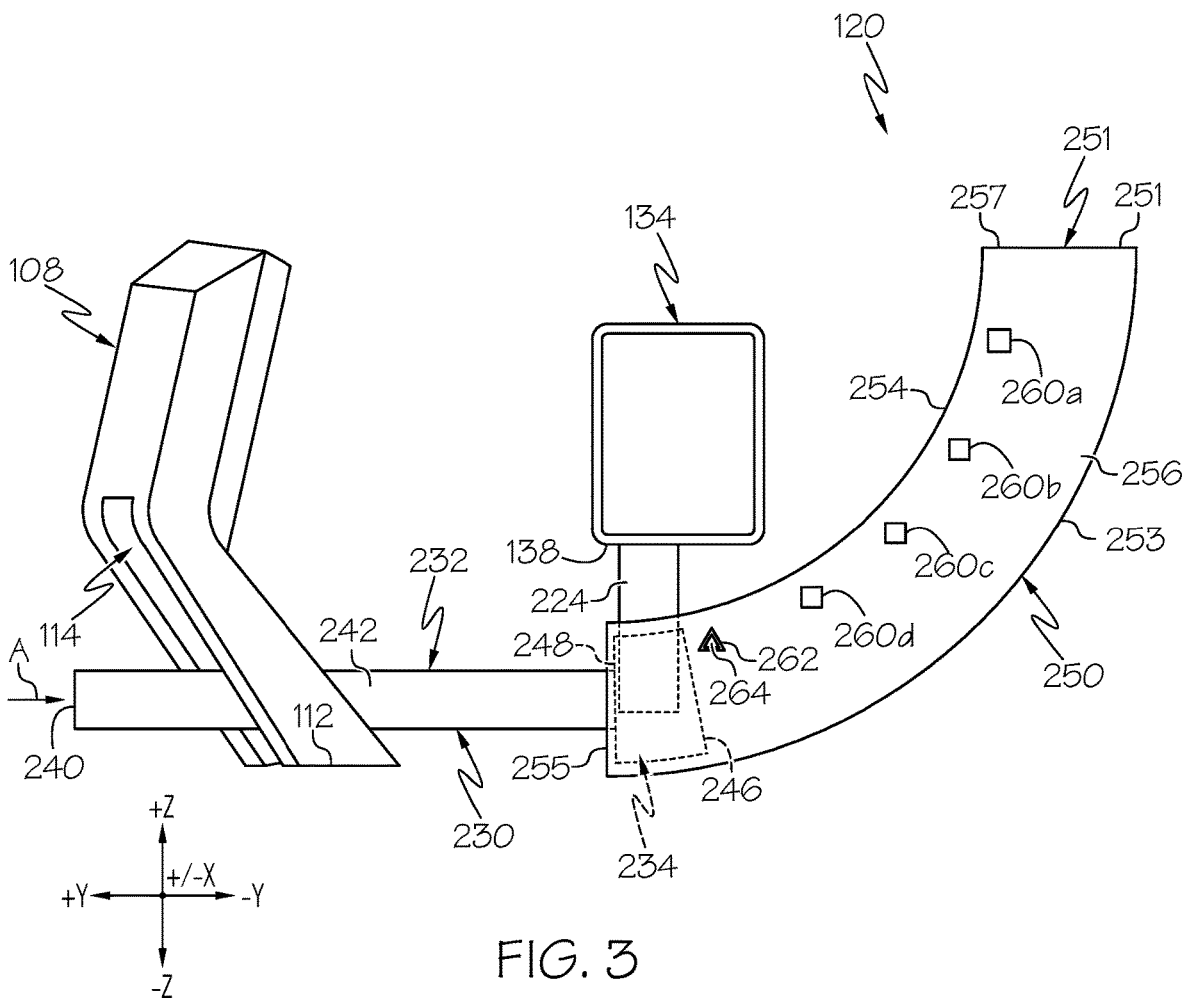
FIG. 3 schematically depicts side view of the tow hook assembly of FIG. 2 in the extended position and engaging a front bumper of the vehicle of FIG. 1, according to one or more embodiments shown and described herein.
Figure 4:
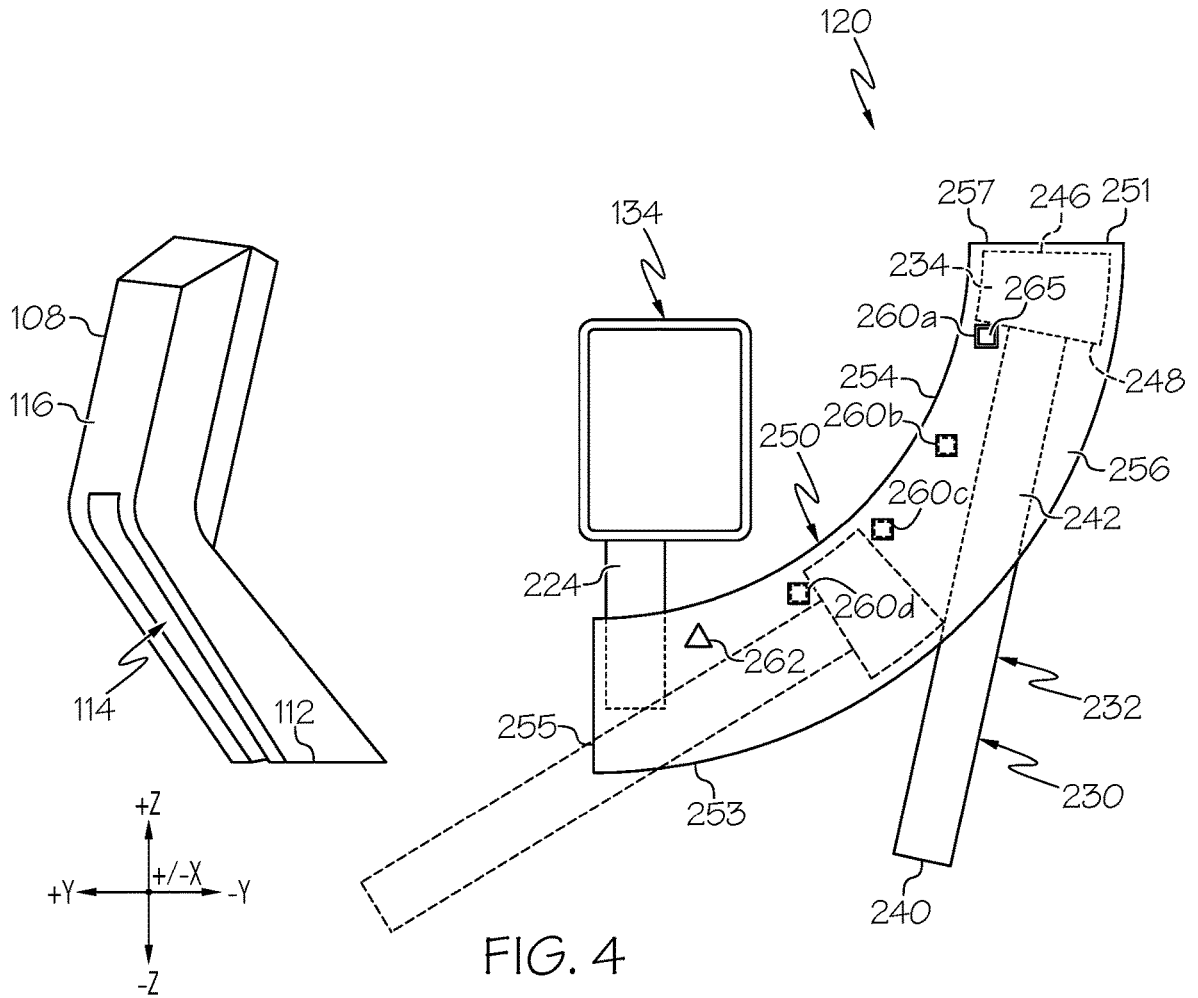
FIG. 4 schematically depicts a side view of the tow hook assembly of FIG. 2 in a retracted position, according to one or more embodiments shown and described herein.

As seen in FIG. 2-4, the first side wall 256 and the second side wall 258 of the housing 250 further includes one or more rear openings 260a, 260b, 260c, 260d, and a front opening 262. The front opening 262 allows a shear pin 264, as described below, to extend through the first side wall 256, the arcuate interior 251, and the second side wall 258. The rear openings 260a, 260b, 260c, 260d allow for a holding pin 265, as described further below, 265 to extend through the first side wall 256, the arcuate interior 251, and the second side wall 258. The front opening 262 is formed in the first side wall 256 proximate the front end 255 of the housing 250 and the rear openings 260a, 260b, 260c, 260d are formed in the first side wall 256 and the second side wall 258 between the front opening 262 and the rear end 257 of the housing 250. The shear pin 264 is permitted to extend through the front opening 262 and prohibited from extending through any one of the rear openings 260a, 260b, 260c, 260d. For example, the front opening 262 may be of a shape only the shear pin 264 can extend. Similarly, the holding pin 265 is permitted to extend through any one of the rear openings 260a, 260b, 260c, 260d, and prohibited from extend through the front opening 262 For example, the rear openings 260a, 260b, 260c, 260d may be of a shape only the holding pin 265 may extend through.

A first attachment member 222 and a second attachment member 224 are provided to attach the housing 250 to the cross member 134. In embodiments, the first attachment member 222 and second attachment member 224 are shaped in a general L-shape including a first portion 221a, 221b perpendicular to a second portion 223a, 223b extending from the first portion 221a, 221b. The first portion 221a of the first attachment member 222 and the first portion 221b of the second attachment member 224 are coupled to the lower wall 138 of the cross member 134. The second portion 223a of the first attachment member 222 is coupled to the first side wall 256 of the housing 250. The second portion 223b of the second attachment member 224 is coupled to the second side wall 258 of the housing 250. Thus, the housing 250 is coupled to the cross member 134. It is to be understood that the first attachment member 222 and the second attachment member 224 may be coupled to the housing 250 or the cross member 134 with welds, bolts, fasteners, clips, or the like. In some embodiments, the second portion 223a of the first attachment member 222 and the second portion 223b of the second attachment member 224 may include an opening that is of the same shape as the front opening 262 in the housing 250, as to let an object extend therethrough.

Referring to FIGS. 2 and 3, the tow hook 230 of the tow hook assembly 120 is shown in an extended position. The tow hook 230 includes a receiving member 232 and a retaining block 234. The receiving member 232 includes a leading portion 240 opposite a distal portion 242. The distal portion 242 includes a rear end 241 extending from the retaining block 234 and a forward end 243 opposite the rear end 241. The leading portion 240 of the receiving member 232 extends from the forward end 243 of the distal portion 242.

The retaining block 234 includes a front surface 248 and a rear surface 246 opposite the front surface 248. The rear end 241 of the distal portion 242 is coupled to the front surface 248 of the retaining block 234, with the leading portion 240 of the receiving member 232 extending opposite the retaining block 234. The leading portion 240 of the receiving member 232 is shaped in a general J-shape to allow attachments, such as tow hook straps, to hook with and to tow the vehicle 100, while the distal portion 242 of the receiving member 232 is a substantially straight member. The retaining block 234 is dimensioned to fit securely within the arcuate interior 251 of the housing 250, and to remain movable throughout the arcuate interior 251 of the housing 250. Specifically, the retaining block 234 rides along the lower surface 253 of the housing 250. In embodiments, the front surface 248 of the retaining block 234 may engage with the front end 255 of the housing 250 to prevent the retaining block 234 of the tow hook 230 from sliding out of the arcuate interior 251 of the housing 250. It should be appreciated that the housing 250 may include one or more stoppers 259a to prevent the retaining block 234 from being removed from the arcuate interior 251 of the housing 250 out of the front end 255 of the housing 250 or out of the rear end 257 of the housing 250.

As described herein, the tow hook assembly 120 further includes a shear pin 264 positionable to extend through the front opening 262 in the first side wall 256 of the housing 250 when the tow hook 230 is in the extended position. However, it should be understood that the shear pin 264 may extend through other parts of the housing 250 without extending through the front opening 262 such as, for example, from the upper surface 254 of the housing 250. In embodiments in which the first attachment member 222 overlaps the front opening 262, a similar opening may be formed in the first attachment member 222 to permit the shear pin 264 to extend through the first side wall 256 of the housing 250. Further, in embodiments, the shear pin 264 may extend through the front opening 262 formed in the first side wall 256 and a corresponding opening formed in the second side wall 258. In embodiments, as shown, the shear pin 264 is positionable rearwardly of the retaining block 234 in the vehicle longitudinal direction when the tow hook 230 is in the extended position. However, in some embodiments, the retaining block 234 of the tow hook 230 may also include an opening formed therein that would allow the shear pin 264 to extend therethrough. The shear pin 264 is formed of a material having a first shear strength. The holding pin 265, described below, is formed of a material having a second shear strength greater than the first shear strength of the shear pin 264. Further, in some embodiments, the front opening 262 has a first shape that corresponds to the shape of the shear pin 264 such that the holding pin 265 is not permitted to extend therethrough. The rear openings 260a, 260b, 260c, 260d are of a second shape that correspond to the holding pin 265 such that the shear pin 264 is not permitted to extend therethrough.

Now referring to FIG. 3, a side view of the tow hook assembly 120 in the extended position is depicted. In the extended position, the distal portion 242 and the leading portion 240 of the tow hook 230 extends from the housing 250 in the vehicle longitudinal direction, the leading portion 240 of the tow hook 230 is positioned exteriorly outside of the front surface 116 of the front bumper 108, i.e., in the forward longitudinal direction, through the opening 114 formed in the front bumper 108. The opening 114 formed in the front bumper 108 extends downward through the bottom surface 112 of the front bumper 108 to allow the receiving member 232 of the tow hook 230 to move therethrough as the tow hook 230 moves from the extended position into the retracted position, as discussed in more detail herein. The front surface 248 of the retaining block 234 abuts the front end 255 of the housing 250. The shear pin 264 extends through the front opening 262 in the first side wall 256 and into the arcuate interior 251 of the housing 250 rearward of the retaining block 234. The shear pin 264 abuts against the rear surface 246 of the retaining block 234 to retain the tow hook 230 in the extended position. Stated another way, the shear pin 264 inhibits the retaining block 234 from moving in a rearward direction through the arcuate interior 251 toward the rear end 257 of housing 250 until a force exceeding the threshold in the direction of arrow A is applied to the leading portion 240 of the tow hook 230. It should be understood that the shear pin 264 may be located at any position in or around the retaining block 234 to inhibit the retaining block 234 from moving in a rearward direction, for example, the shear pin 264 may extend through the housing 250 and the retaining block 234 of the tow hook 230.

Now referring to FIG. 4, a side view of the tow hook assembly 120 in the retracted position is depicted. In the retracted position, the rear surface 246 of the retaining block 234 of the tow hook 230 abuts the rear end 257 of the housing 250. It should be appreciated that the housing 250 may include one or more stoppers 259b, as seen in FIG. 2, to prevent the retaining block 234 from being removed from the arcuate interior 251 of the housing 250 out of the rear end 257 of the housing 250. The receiving member 232 of the tow hook 230 extends substantially downward in the vehicle vertical direction. In the retracted position, the distal portion

242 of the tow hook 230 extends through the slot 252 in the lower surface 253 of the housing 250 and the leading portion 240 is positioned exteriorly below the housing 250 in the vehicle vertical direction. In embodiments, the holding pin 265 can be used to hold the tow hook 230 in the retracted position. For example, the holding pin 265 may be positioned through the rear opening 260a in the first side wall 256 of the housing 250. In some embodiments, the holding pin 265 abuts against the front surface 248 of the retaining block 234 to retain the tow hook 230 in the retracted position. The holding pin 265 inhibits the retaining block 234 from moving towards the front end 255 of the housing 250. In other embodiments, the holding pin 265 may extend through the tow hook 230, either through the distal portion 242 of the receiving member 232 or the retaining block 234. It should be understood that the holding pin 265 may be located at any position in or around the retaining block 234 through the housing 250 as to inhibit the retaining block 234 from moving in a forward vehicle longitudinal direction through the arcuate interior 251 of the housing 250. In some embodiments, the retracted position is a position in which the retaining block 234 of the tow hook 230 moves rearward from the extended position within the housing 250.

In embodiments, the tow hook 230 may be positioned in one or more intermediate positions between the extended position and the retracted position. In any of the intermediate positions, the receiving member 232 of the tow hook 230 is positioned at a downward oblique angle in the vehicle vertical direction. The distal portion 242 of the receiving member 232 may extend through the slot 252 in the lower surface 253 of the housing 250. The distal portion 242 is movable through the slot 252 in the housing 250. In such embodiments, the holding pin 265 may extend through one of the rear openings 260b, 260c, 260d between the front opening 262 and the rear opening 260a and abut against the front surface of the retaining block 234 to prevent the tow hook 230 from moving towards the front end 255 of the housing 250. In embodiments, two holding pins 265 may be utilized with one holding pin 265 extending through the housing 250 forward of the retaining block 234 and another holding pin 265 extending through the housing 250 rearward of the retaining block 234 to further secure the tow hook 230 in an intermediate position. For example, as seen in FIG. 4, the retaining block 234 may be positioned between rear opening 260a and rear opening 260a and a holding pin 265 positioned through each of the rear openings 260a, 260b to inhibit the retaining block 234 from moving toward the front end 255 and the rear end 257 of the housing 250. As another non-limiting example, the retaining block 234 may be positioned between rear opening 260b and rear opening 260c and a holding pin 265 positioned through each of the rear openings 260b, 260c to maintain the position of the tow hook 230. As yet another non-limiting example, the retaining block 234 may be positioned between rear opening 260c and rear opening 260d and a holding pin 265 and a second holding pin 265 positioned through each of the rear openings 260c, 260d to maintain the position of the tow hook 230.

Upon a force exceeding a predetermined threshold being applied against the leading portion 240 of the receiving member 232 of the tow hook 230 in the direction of arrow A (FIG. 3), with the tow hook 230 in the extended position and the shear pin 264 extending through the front opening 262, the shear pin 264 shears to allow the retaining block 234 of the tow hook 230 to move along the arcuate interior 251 of the housing 250 from the extended position toward the retracted position. In doing so, the receiving member 232 of the tow hook 230 extends through the slot 252 in the lower surface 253 of the housing 250. The position of the tow hook 230 in the retracted position allows the tow hook 230 to move out of position of the front end collision to reduce contact with a barrier being contacted.

From the above, it is to be appreciated that defined herein is a vehicle with a tow hook is adjustable between an extended position, a retracted position and intermediate position, such that the tow hook moves into the retracted position from the extended position upon an impact force during a front end collision to reduce injure to an occupant, pedestrian, or other components of the vehicle. Further the tow hook is adjustable by a user to be placed in the position of the user's desire.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly coupled to a cross member of a vehicle, the tow hook assembly comprising:
    a housing including an arcuate interior defining an arcuate path;
    a tow hook moveable between an extended position and a retracted position, the tow hook including a retaining block, and a receiving member including a distal portion extending from the retaining block and a leading portion extending from the distal portion; and
    a shear pin positionable to extend through the housing,
    wherein, when the tow hook is in the extended position and a force exceeding a predetermined threshold is applied to the leading portion of the receiving member, the shear pin shears to permit an entirety of the retaining block of the tow hook to move along and within the arcuate path of the arcuate interior of the housing towards the retracted position.

2. The vehicle of claim 1, wherein the shear pin is positionable rearward of the retaining block of the tow hook in a vehicle longitudinal direction.

3. The vehicle of claim 1, wherein the shear pin is positionable to extend through the housing and the retaining block of the tow hook to retain the tow hook in the extended position.

4. The vehicle of claim 1, wherein the housing includes an upper surface, a lower surface opposite the upper surface, a first side wall, a second side wall opposite the first side wall, a front end, and a rear end opposite the front end defining the arcuate interior, a slot is formed in the lower surface extending from the front end to the rear end, the receiving member extends through the slot formed in the lower surface as the tow hook moves from the extended position to the retracted position.

5. The vehicle of claim 4, wherein the retaining block includes a front surface and a rear surface opposite the front surface, the front surface of the retaining block abuts the front end of the housing when the tow hook is in the extended position, and the rear surface of the retaining block abuts the rear end of the housing when the tow hook is in the retracted position.

6. The vehicle of claim 4, further comprising a first holding pin positionable through the housing to retain the tow hook in the retracted position, the first holding pin being formed from a material having a hardness greater than a hardness of a material forming the shear pin.

7. The vehicle of claim 6, wherein the first holding pin is positionable to extend through the housing to retain the tow hook in an intermediate position between the extended position and the retracted position.

8. The vehicle of claim 7, further comprising a second holding pin, wherein the first holding pin is positionable to extend through the housing at a location forward of the retaining block and the second holding pin is positionable to extend through the housing at a location rearward of the retaining block when the tow hook is in the intermediate position.

9. The vehicle of claim 6, wherein the shear pin and the first holding pin are positionable to extend through the first side wall.

10. The vehicle of claim 9, wherein a front opening is formed in the first side wall proximate the front end of the housing and a rear opening is formed in the first side wall proximate the rear end of the housing, the shear pin is permitted to extend through the front opening and prohibited from extending through the rear opening, the first holding pin is permitted to extend through the rear opening and prohibited from extend through the front opening.

* * * * *